United States Patent [19]
Muntz et al.

[11] Patent Number: 5,896,427
[45] Date of Patent: Apr. 20, 1999

[54] SYSTEM AND METHOD FOR MAINTAINING NETWORK SYNCHRONIZATION UTILIZING DIGITAL PHASE COMPARISON TECHNIQUES WITH SYNCHRONOUS RESIDUAL TIME STAMPS

[75] Inventors: Gary S. Muntz, Lexington, Mass.; Steven E. Jacobs, Atkinson, N.H.; Guy Fedorkow, Watertown, Mass.

[73] Assignee: Cisco Technology, Inc., San Jose, Calif.

[21] Appl. No.: 09/127,576

[22] Filed: Jul. 31, 1998

Related U.S. Application Data

[63] Continuation of application No. 08/573,197, Dec. 15, 1995, Pat. No. 5,822,383.

[51] Int. Cl.$^6$ .............. H04L 25/36; H04L 25/40; H04L 7/00
[52] U.S. Cl. .............. 375/372; 375/364; 370/516
[58] Field of Search .............. 375/362, 371, 375/356, 354, 377, 358, 372; 370/507, 504, 503, 516, 394, 395, 506, 517

[56] References Cited

U.S. PATENT DOCUMENTS

| | | |
|---|---|---|
| 4,961,188 | 10/1990 | Lau . |
| 5,210,773 | 5/1993 | Schmid et al. .............. 375/372 |
| 5,260,978 | 11/1993 | Fleischer et al. . |
| 5,394,442 | 2/1995 | Lill .............. 375/369 |
| 5,396,492 | 3/1995 | Lien . |
| 5,526,362 | 6/1996 | Thompson et al. . |
| 5,555,261 | 9/1996 | Nakayama et al. . |
| 5,608,731 | 3/1997 | Upp et al. .............. 370/516 |
| 5,619,500 | 4/1997 | Hiekali .............. 370/414 |
| 5,621,775 | 4/1997 | Etienne .............. 375/372 |
| 5,694,397 | 12/1997 | Burton .............. 370/516 |

*Primary Examiner*—Jason Chan
*Assistant Examiner*—Jean B Corrielus
*Attorney, Agent, or Firm*—Cesari & McKenna, LLP

[57] ABSTRACT

A network node destination module for ensuring proper reception and transmission of information over a network having an optional network reference clock including an input stage for receiving the information, a synchronous residual time stamp (SRTS) timing control stage for implementing digital phase comparison techniques utilizing the network reference clock, and a clock generation stage for generating a transmit clock in response to a control value generated by the SRTS timing control stage. The SRTS timing control stage maintains a constant phase offset between the receive clock of the source node and the transmit clock of the destination node. The SRTS timing control stage includes an RTS sample generator for generating a local RTS sample for comparison with the source RTS sample to determine a current phase offset between the source and clocks. The current phase offset is then compared to a target phase offset stored in a phase register to generate a control value. The clock generation stage adjusts the transmit clock in response to a filtered control value and transmits the source data to the destination CPE at the adjusted transmit clock frequency. By maintaining a constant phase offset, the frequencies of the receive clock of the source node and the transmit clock of the destination node are synchronized, thereby providing CBR service. In addition to performing SRTS clock recovery techniques, the destination module may also be configured to perform adaptive clock recovery (ACR) and synchronous network clock (SNC) techniques.

5 Claims, 7 Drawing Sheets

SYSTEM AND METHOD FOR MAINTAINING NETWORK SYNCHRONIZATION UTILIZING DIGITAL PHASE COMPARISON TECHNIQUES WITH SYNCHRONOUS RESIDUAL TIME STAMPS

BACKGROUND OF THE INVENTION

This is a continuation of U.S. patent application Ser. No. 08/573,197, filed Dec. 15, 1995, now U.S. Pat. No. 5,822,383, entitled SYSTEM AND METHOD FOR MAINTAINING NETWORK SYNCHRONIZATION UTILIZING DIGITAL PHASE COMPARISON TECHNIQUES WITH SYNCHRONOUS RESIDUAL TIME STAMPS. The entirety of said copending application Ser. No. 08/573,197, now U.S. Pat. No. 5,822,383, is incorporated herein by reference.

The following applications are related to the present application:

U.S. Patent Application entitled "AN IMPROVED SRTS CLOCK RECOVERY SYSTEM FOR USE IN A HIGHLY STRESSED NETWORK ENVIRONMENT," Ser. No. 08/573,297, now U.S. Pat. No. 5,742,649, issued Apr. 21, 1998, naming as inventors Gary S. Muntz and Stanley A. Lackey, Jr., assigned to the assignee of the present invention.

U.S. Patent Application entitled "AN IMPROVED SRTS CLOCK RECOVERY SYSTEM IMPLEMENTING ADAPTIVE CLOCK RECOVERY TECHNIQUES," Ser. No. 08/573,302, now U.S. Pat. No. 5,812,618, naming as inventors Gary S. Muntz and Steven E. Jacobs, assigned to the assignee of the present invention and filed concurrently with filing of the parent of the subject application.

FIELD OF THE INVENTION

The present invention relates generally to network synchronization and clock recovery, and more particularly, to a network node that maintains network synchronization utilizing digital phase comparison techniques with Synchronous Residual Time Stamp (SRTS) for circuit emulation of real-time circuit switched telecommunications services in a broadband asynchronous transfer mode (ATM) network.

BACKGROUND OF THE INVENTION

An area of network communications that has been evolving since the 1980's is the area of integrated services digital network (ISDN) systems. Since its inception, ISDN has provided a wide variety of services, including voice and data services with bit rates of up to 64 Kbps, integrated within a single network. For voice communications and many text and data applications, the 64 Kbps ISDN rate is sufficient. However, there are increasing demands for broadband communications with substantially higher bit rates such as, for example, high-speed data communications, video, and high resolution graphics communications. Thus, a second generation of ISDN, referred to as broadband ISDN (B-ISDN), has developed to support these latter types of communications while still providing the same advantages of the first generation ISDN.

The first generation I SDN utilizes a synchronous transfer mode wherein, for the duration of a connection, a synchronous channel with constant bit rate (CBR) is allocated to that connection. Although suitable for certain applications, synchronous transfer mode is generally unsuitable for integration of those latter service types which have bit rate requirements above 2 Mps. This has lead to the development of asynchronous transfer mode (ATM) as the preferred method for transferring information in a B-ISDN system. ATM is a method wherein a user's data is partitioned into fixed-length cells for transmission without a specified timing requirement, thereby enabling cell transfer over a synchronous or asynchronous network.

Voice, video, image and high-speed data communications require high-speed transmission capabilities to support associated high-bandwidth requirements; optical transmission systems are especially suitable for this purpose. Accordingly, B-ISDN systems typically employ synchronous optical network (SONET) technology as a transport system. The International Telecommunications Union Telecommunications Standardization Sector (ITU-T, formerly the CCITT) essentially describes a B-ISDN network as a system implemented with ATM and SONET technologies built on the concepts of the ISDN model.

FIG. 1 is a block diagram of an exemplary B-ISDN network. Network 100 includes a SONET physical carrier transport system 102 for transporting data between ATM switches 104, 106 and 108. ATM switches 104–108 provide a network interface for a user's customer premises equipment (CPE), such as a PBX or local computer. In the exemplary network of FIG. 1, ATM switch 104 couples CPEs 110, 112, and 114 with network 102, while ATM switches 106 and 108 connect CPEs 116, 118 and 120, respectively, to that network. The function and operation of ATM switches 104–108, also referred to as ATM nodes, are described further herein.

In contrast to the circuit switching orientation of the first generation ISDN, B-ISDN has a cell relay or packet-switching orientation. FIG. 2 illustrates a format of a cell-based transmission 200 generated by an ATM switch such as switch 104. Cell-based transmission 200 includes a plurality of cells 202, each of which has a size of 53 bytes, including a 5-byte header 204 and a 48-byte payload 206 of user data. Header 204 is generally used for achieving transmission over network 100 and, to that end, includes information pertaining to such functions as routing and traffic control. Segmentation of the data into cells results in an integrated approach to networking, providing flexibility for handling different types of information such as voice, data, image and video over a single transmission facility 102.

One of the many types of services which can be supplied by network 100 is a circuit emulation service, wherein user data flows through the network at a constant bit rate (CBR). This service typically uses ATM Adaptation Layer 1 (AAL1), which is specifically designed for CBR applications. Control information required for these operations is included in a control field 208. In the illustrative embodiment, control field 208 is a 1-byte field located in the 48-byte payload 206 dedicated to user data in each cell 202. Bits in successive control fields can optionally be used to convey a Residual Time Stamp (RTS), used in applications employing SRTS clock recovery. Depending on the implementation, source CPE 308 may provide AAL1 segmentation and reassembly, or those functions may be provided by source ATM switch 304.

Timing variations inevitably exist among the network components. High frequency variations, referred to as jitter, are typically reduced to manageable levels through the use of jitter filters in each node. Low frequency variations, referred to as wander, are typically dealt with in a network through the use of buffers located within the nodes of the network. Specifically, these buffers either repeat (i.e., underflow) or discard (i.e., overflow) blocks of data to compensate for differences in timing between the source and destination nodes. Underflow and overflow operations, generally referred to as slip, typically result in errors within the network. For example, in a voice circuit, slip may be detected by popping or clicking sounds, whereas in data transmissions, slip is manifested in the loss of data.

Various clock recovery techniques have been developed to maintain network synchronization of CBR services in ATM networks to avoid such loss of data and to ensure proper reception of CBR service traffic. These techniques include synchronous residual time stamp (SRTS), adaptive clock recovery (ACR) and synchronous network clocking (SNC) techniques.

In SRTS, timing information is typically carried through the network along with the data transmission. The destination node uses this timing information to recover the frequency of the source node clock which determines the frequency of a transmit clock that the destination node uses to transmit data to a destination CPE.

A drawback to the SRTS clock recovery method is that it is based upon the assumption that identical network reference clocks are provided to the source and destination nodes. Yet, this is often not the case because each portion of the network may be synchronized to a different reference clock creating multiple timing domains. Although these local clocks may both be referenced to a stratum 1 clock, the local clocks may experience a phase departure over time that continues to increase until a slip occurs. The use of different reference clocks is especially likely when the source and destination nodes are located in different countries.

Moreover, if a network element such as a digital cross connect fails, certain network nodes may lose their reference clock. These nodes must then utilize their local clocks, resulting in an increased loss of data due to the difference in phase and frequency between the node's local and reference clocks. The resulting phase departure further manifests itself as noted, as clicking and popping noises in voice transmissions and in the loss of data in image and video transmissions. Clearly, the SRTS clock recovery method is only as reliable as the consistency of the reference clocks utilized by the source and destination nodes.

The synchronous network clocking method has a similar problem, in that it mandates that the destination and source nodes utilize the network reference clock frequency as the sources for determining their respective local clocks. In properly operating networks this provides superior jitter and wander characteristics. However, unlike SRTS and ACR techniques, a network node implementing SNC cannot accept user-supplied clocking.

In ACR, the occupancy of a buffer receiving the incoming traffic is used to directly control the frequency of the destination node transmit clock. Since the adaptive clock recovery method does not rely on a common reference clock, it is typically used in systems wherein the distribution of a reference clock frequency is either undesirable or impracticable. The ACR technique maintains the data buffer near a target depth by varying the transmit clock rate about its nominal value. This achieves CBR service without requiring a network reference clock. However, adaptive clock recovery can create large amounts of wander as a side effect of adjusting the clock frequency, and is therefore primarily used in private, smaller networks rather than larger public networks.

Conventional network nodes utilize a particular clock recovery or network synchronization or clock recovery method based upon existing equipment and service priorities. For example, transmission between source and destination nodes which do not both have access to the same reference clock must use adaptive clock recovery technique. Further, a network node that cannot to be timed from a network reference clock cannot use the SNC technique. In addition, a network node implementing SRTS has an interoperability limitation of having to communicate with only nodes that implement SRTS generation techniques.

What is needed, therefore, is a means for ensuring the proper reception and transmission of data though a network that may be configured in accordance with a variety of user system timing requirements and to communicate with network nodes utilizing various types of clock recovery and network synchronization techniques.

SUMMARY OF THE INVENTION

The present invention comprises an improved network node destination module for ensuring proper reception and transmission of information over a network having a network reference clock. The destination module includes an input stage for receiving the information, a synchronous residual time stamp (SRTS) timing control stage implementing digital phase comparison techniques utilizing residual time stamps (RTSs), and a clock generation stage for generating a transmit clock in response to a control value generated by the SRTS timing control stage. By maintaining a constant phase offset between the source and destination clocks, the frequencies of the receive clock of the source node and the transmit clock of the destination node are synchronized, thereby providing CBR service.

Specifically, the input stage includes a cell/packet receiver that parses an incoming information stream into RTS and data portions, both of which are loaded into their respective FIFOs as they are received. The input stage also includes a frequency translator that converts the network reference clock into an SRTS reference clock for use by the SRTS timing control stage.

The SRTS timing control stage maintains a constant phase offset between the receive clock of the source node and the transmit clock of the destination node by implementing a novel digital phase comparison technique. The SRTS timing control stage includes an RTS sample generator for generating a local RTS sample for comparison with the RTS portion of the information stream to determine a current phase offset between the source and destination clocks. The difference between the current phase offset and a previously determined target phase offset is then determined. This target phase offset is an initial phase difference between the source and transmit clocks stored in a phase register when the circuit is established. The difference between the target and current RTS phase offsets is the control value provided to the clock generation stage.

The clock generation stage adjusts the frequency of the transmit clock in response to the control value generated by the SRTS timing control stage and transmits the source data to the destination CPE at the adjusted transmit clock frequency. Significantly, the clock generation stage includes a low pass filter for filtering the control value prior to providing it to a numerically controlled oscillator (NCO) that generates the transmit clock.

In another preferred embodiment, the destination module of the present invention may be configured to perform adaptive clock recovery (ACR) and synchronous network clock (SNC) techniques in addition to SRTS clock recovery. This enables a network node implementing the destination module to provide CBR services regardless of the availability of a system reference clock.

The ACR destination module includes an input stage, ACR timing control stage, and a clock generation stage. The input stage includes a cell/packet receiver that parses an incoming information stream into RTS (if any) and data portions, both of which are loaded into their respective FIFOs as they are received. Furthermore, the ACR destination module does not require a frequency translator nor an RTS FIFO as in the SRTS input stage since neither a network reference clock nor an RTS sample are used by the ACR destination module.

The ACR timing control stage receives from the input stage an indication of the current depth of the data buffer and compares this value with a target buffer depth previously loaded into a target depth register. The result of this comparison is the control value provided to the clock generation stage. The ACR clock generation stage performs the same functions as the SRTS clock generation stage described above.

The SNC destination module includes an input stage, SNC timing control stage, and a clock generation stage. The input stage includes a cell/packet receiver, and RTS and data FIFOs. The cell/packet receiver parses an incoming information stream into RTS (if any) and data portions, both of which are loaded into their respective FIFOs as they are received. The input stage also includes a frequency translator that converts the network reference clock into a nominal line clock that is passed directly through the SNC timing control stage and presented to the clock generation stage. The clock generation stage transmits the source data to the destination CPE at this nominal line clock frequency.

In this embodiment, the destination module is configured to perform all three of the above methods, and includes a selector to enable a user to select one of the three timing control stages to implement.

Advantageously, the ability of the destination module to implement multiple timing techniques provides the network node with the capability to interface any type of user CPE with the network regardless of the timing requirements of the CPE. Moreover, the ability to implement a selected one of multiple timing techniques provides the network node with the ability to communicate with any type of network node regardless of the clock recovery or network synchronization method employed by that node. Another advantage of the present invention is that the timing control mechanism is selectable by the user. This provides the user with the ability to reconfigure the network node as user requirements evolve.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

For a fuller understanding of the nature of the invention, reference should be had to the following detailed description taken in connection with the accompanying drawings, in which.

DETAILED DESCRIPTION OF THE PREFERRED EMBODIMENTS

A. System Environment

Figure 1:
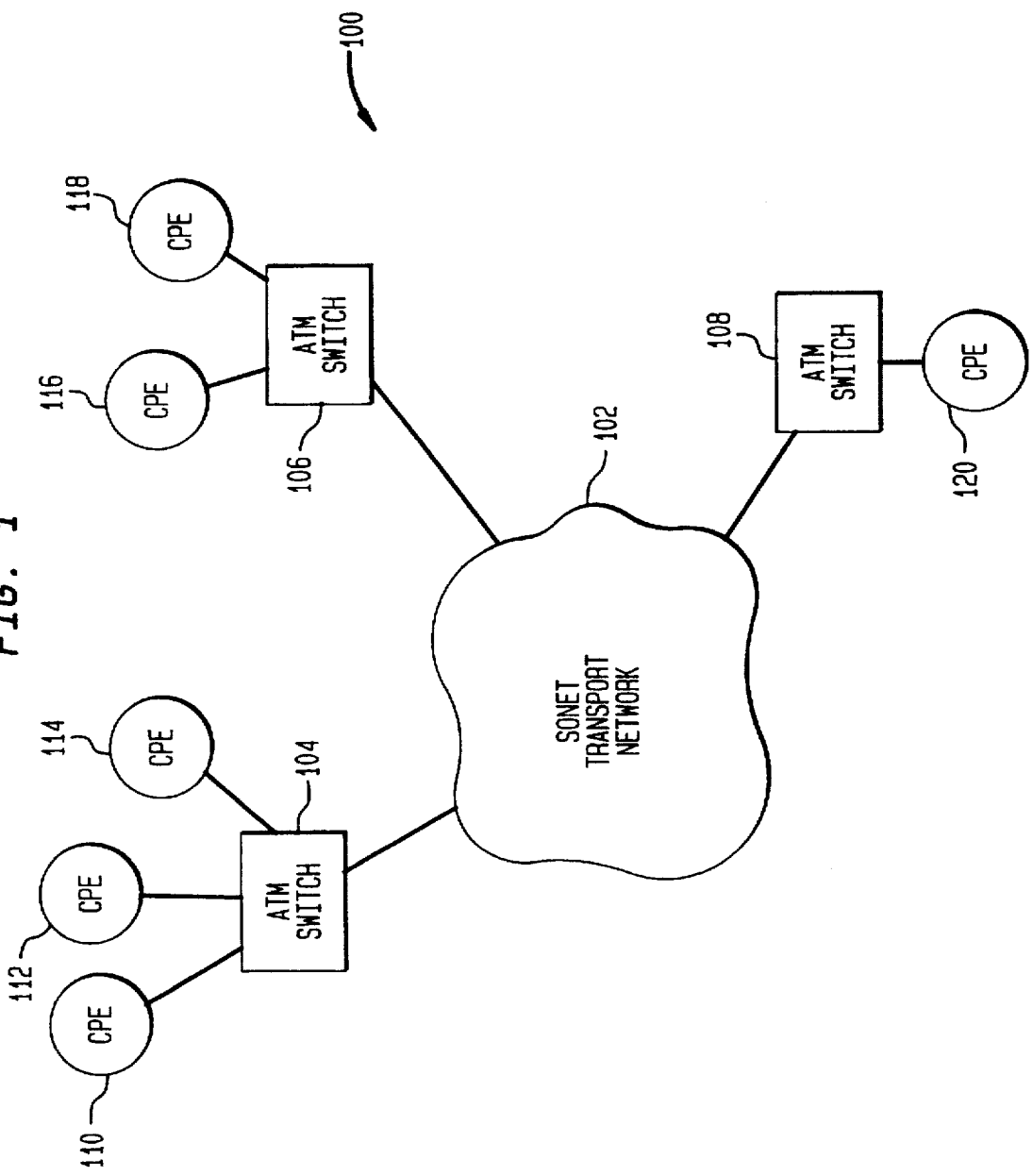
FIG. 1 is a high level block diagram of a typical broadband integrated services digital network (B-ISDN)
Figure 2:
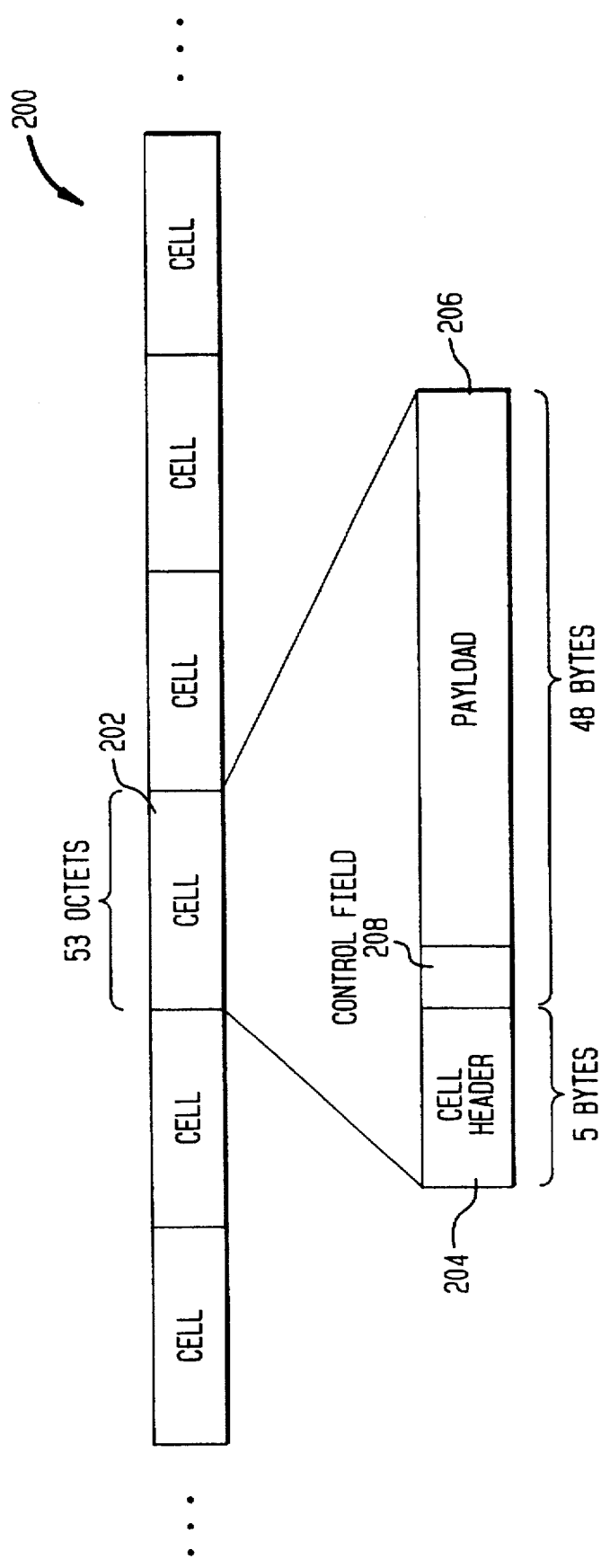
FIG. 2 is a block diagram of an ATM cell transmission, illustrating the fields of an individual ATM cell.
Figure 3:
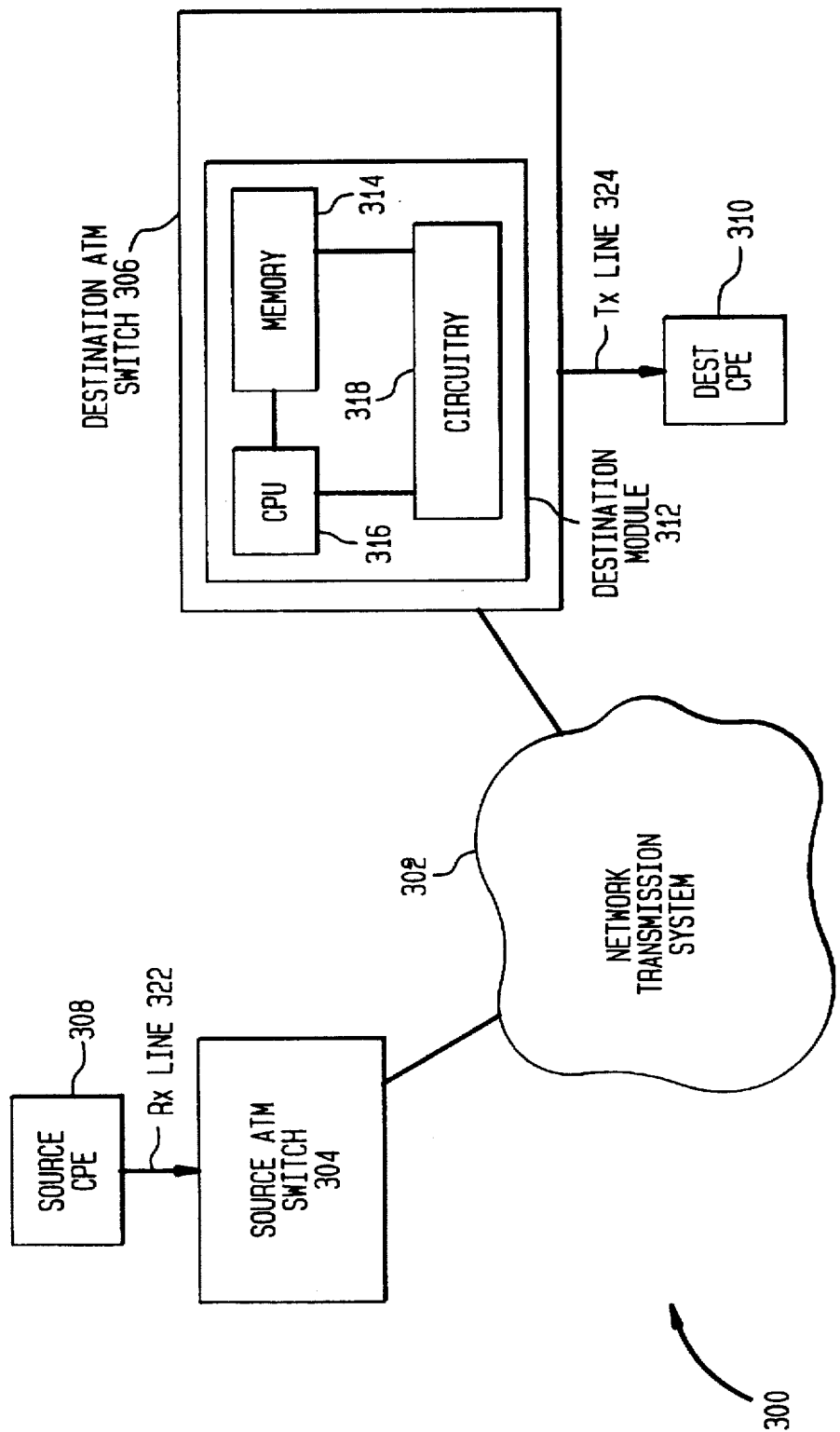
FIG. 3 is a high level block diagram of a B-ISDN system implementing the source and destination nodes of the present invention.

FIG. 3 is a block diagram of a network system 300 wherein the preferred embodiments of the present invention are implemented. Network system 300 comprises a plurality of nodes, some of which interface customer premises equipment (CPE) to the network. The nodes comprise a source node 304, a destination node 306, and a plurality of other nodes not shown.

Generally, source node 304 receives user information from source CPE 308 via receive line 322 for transmission over network transmission system 302 to destination CPE 310. Source node 304 processes the information for proper transmission over network 302 and then transfers that information to destination node 306 as a network transmission through network system 302. Destination node 306 receives and processes the network transmission, providing the user information to destination CPE 310 via transmit line 324.

The source CPE provides the source node with a transmit signal that includes the source information and a receive line clock. In the illustrative embodiment, receive line clock is a T1 line clock signal operating at 1.544 MHz. In alternate embodiments the receive clock signal may be an E1 clock signal, operating at 2.048 MHz. However, as would be apparent to one skilled in the relevant art, the receive clock may be any clock frequency associated with network 300.

In the illustrative embodiment, network transmission system 302 may have one or more network reference clocks, at least one of which is made available to both source node 304 and destination node 306. In such an embodiment, source node 304 may also generate an RTS sample. The RTS sample is a standard 4 bit value representing the phase offset between the network reference clock and the receive clock provided to the source node. The source node combines the RTS sample with the data and places them in the necessary format appropriate for the type of network 300. In the preferred embodiment wherein source node 304 is an ATM switch, the 4 bit RTS sample is placed in alternating successive control fields 208 of cells 202. However, as would be apparent to one skilled in the relevant art, the RTS sample information may be transmitted in any form consistent with the type of network 300. Furthermore, the phase offset information may be represented by forms other than an RTS sample.

Destination node 306 comprises a destination module 312 of the present invention and a number of other components not shown. Destination module 312 includes a number of interoperable elements, including a central processing unit (CPU) 316, a memory unit 314, and circuitry 318. Destination module 312 may be configured to perform an improved SRTS clock recovery technique that implements a unique digital phase comparison technique described below. An alternative preferred embodiment includes the destination module being configured to perform adaptive clock recovery (ACR), and/or synchronous network clocking (SNC), as well as SRTS techniques. In the preferred embodiment of the present invention, a large portion of destination module 312 is implemented in an application specific integrated circuit (ASIC). However, as would be apparent to those skilled in the relevant art, destination module 312 may be implemented in any manner appropriate for a particular application. Furthermore, in the preferred embodiment of the present invention, network system 300 is a B-ISDN network system. Accordingly, source and destination nodes 304, 306 are preferably ATM switches and network transportation system 302 is a SONET system. However, as one skilled in the relevant art would find apparent, the invention may be implemented in any network system.

B. SRTS Destination Module

Figure 4:
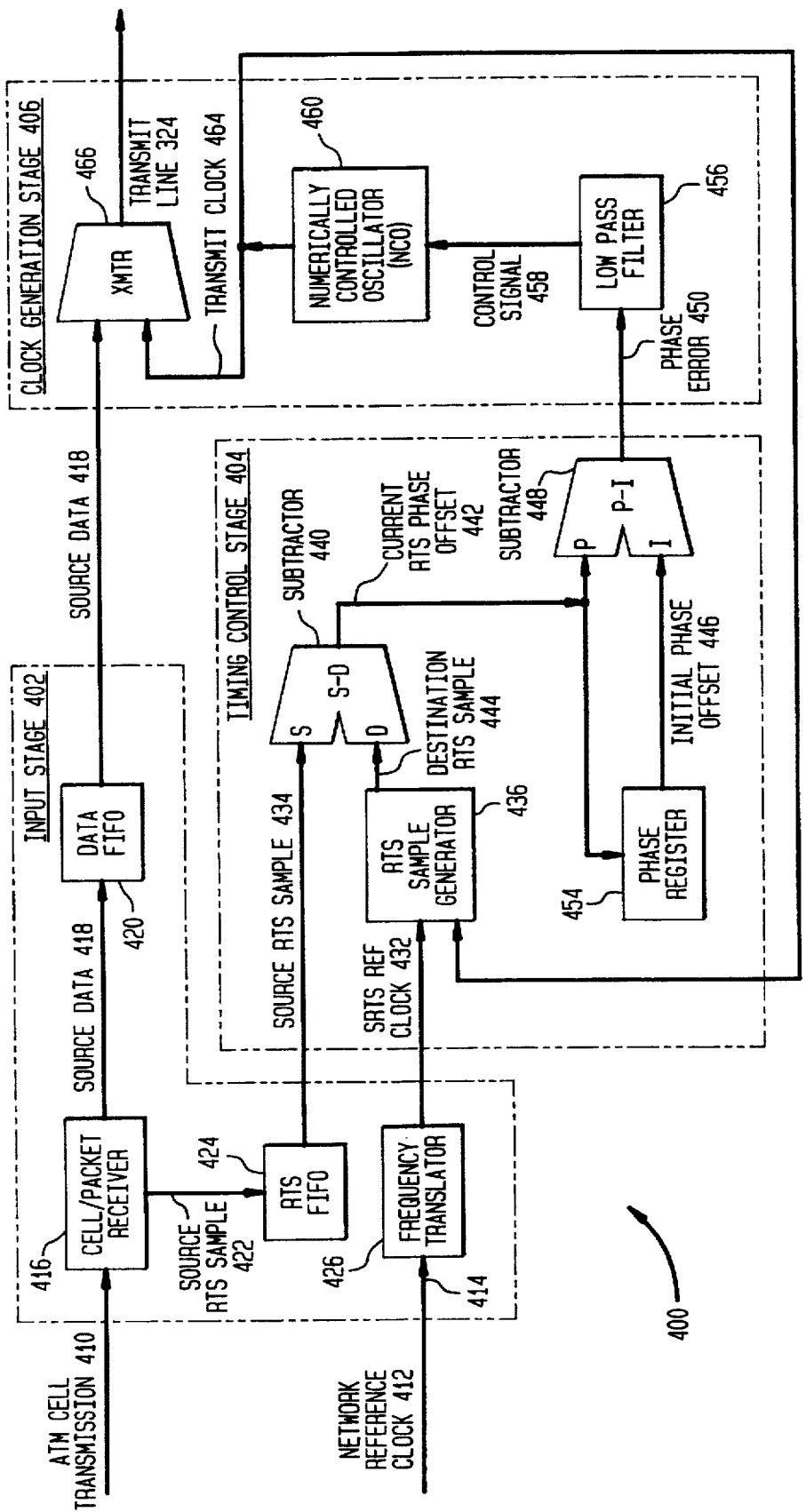
FIG. 4 is a functional block diagram of the destination module of the present invention configured to perform synchronous residual clock recovery (SRTS) clock recovery processing.

FIG. 4 is a functional schematic block diagram of destination module 312 of the present invention configured to perform SRTS clock recovery, referred to as SRTS destination module 400. SRTS destination module 400 ensures proper reception and transmission of information over a network having a system reference clock by maintaining a constant phase difference between the destination node transmit clock and the source node receive clock, thereby forcing their frequencies to be identical. The SRTS destination module 400 includes three stages: an input stage 402, an SRTS timing control stage 404, and a clock generation stage 406. Generally, input stage 402 receives network transmissions including source data intended for destination CPE 310 and a network reference clock 412. Input stage 402 performs various functions to ensure proper reception of the network transmission and provides data and control signals to timing control stage 404 and clock generation stage 406. Input stage 402 includes a cell/packet receiver 416 coupled to a data FIFO 420 and an RTS FIFO 424, and a frequency translator 426. The network information received at input stage 402 includes an ATM cell transmission 410 and a network reference clock 412.

Upon receipt of an ATM cell transmission 410 containing an RTS sample, cell/packet receiver 416 parses the incoming ATM cell transmission into a source RTS sample portion 422 and a source data portion 418. Since network traffic may result in a burst of incoming cells followed by a period of no activity, a phenomenon referred to as cell delay variation (CDV), the received cell transmission is loaded into FIFOs upon receipt. This enables the destination module to transmit the received bursts of data at an independent transmission rate appropriate for destination CPE 310. That is, cell/packet receiver 416 loads source data 418 and source RTS sample 422 into data FIFO 420 and RTS FIFO 424, respectively. Once loaded in their respective FIFOs, the source data and RTS sample are thereafter available to clock generation stage 406 and timing control stage 404, respectively.

Network reference clock 412 is processed by frequency translator 426 to generate an SRTS reference clock 432. In the exemplary embodiment, network reference clock 412 is the T1 clock rate of 1.544 MHz. Frequency translator 426 generates a 2.43 MHz SRTS reference clock 432 based the 1.544 MHz network reference clock 412. In the preferred embodiment of the present invention, frequency translator 426 is implemented in a phase lock loop (PLL), the function and operation of which is considered to be well known to those skilled in the relevant art. However, as would be apparent to one skilled in the art, frequency translator 426 may utilize other translation methods to create a suitable SRTS reference clock 432 from network reference clock 412. It should be noted, however, that a PLL is preferred due to its ability to control jitter and phase transients in the reference clock distribution system.

SRTS timing control stage 404 includes an RTS sample generator 436, subtractor 440, phase register 454, and subtractor 448. Timing control stage 404 receives source RTS sample 434 and SRTS reference clock 432 from input stage 402. In addition, SRTS timing control stage 404 receives a transmit clock 464 generated by clock generation stage 406 (discussed below).

RTS sample generator 436 generates a destination RTS sample 444 based upon SRTS reference clock 432 and transmit clock 464. Destination RTS sample 444 represents the phase offset between the SRTS reference clock 432 and transmit clock 464. As would be apparent to one skilled in the relevant art, RTS sample generator 436 may be implemented in any manner sufficient to generate an appropriate RTS sample for comparison with source RTS sample 434. Furthermore, the function and operation of RTS sample generator 436 is considered to be well known to those skilled in the relevant art.

Destination RTS sample 444 is subtracted from source RTS sample 434 located in RTS FIFO 424 to determine a current RTS phase offset 442. To perform this function, source RTS sample 434 is provided to a source input of subtractor 440 from RTS FIFO 424. Likewise, destination RTS sample 444 is provided to a destination input of subtractor 440 by RTS sample generator 436. Subtractor 440 generates current RTS phase offset 442, representing the difference between source and destination RTS samples 434, 444. As would be apparent to one skilled in the art, the functions performed by subtractor 440 may be implemented in any combinatorial logic or software process appropriate to a particular application.

When the destination module begins operation, the current RTS phase offset 442 initially generated by subtractor 440 is referred to as an initial RTS phase offset 446. The initial source-destination phase offset represents the phase offset between the source and destination at the moment the constant bit rate circuit is established. This phase offset must be preserved to guarantee a constant bit rate service between the source and destination nodes of the network, while minimizing phase transients on transmit line 324. Therefore, the initial RTS phase difference 446 is a target phase offset that is to be maintained as long as the circuit is in use. Since some RTS sample generators produce an erroneous RTS sample immediately following initialization, the second source RTS sample received by the SRTS destination module is considered to be the first reliable, and thus the initial, RTS sample. Thus, the phase offset 442 produced from the second source RTS sample is loaded into phase register 454.

To determine RTS phase error 450, initial RTS phase offset 446 is transferred from phase register 454 to the initial input of subtractor 448. Likewise, current RTS phase offset 442 is transferred from subtractor 440 to the current input of subtractor 448. Subtractor 448 generates a phase error 450 representing the change in source and destination node synchronization experienced since initial RTS phase offset 446 was determined. That is, phase error 450 is an indication of how many reference clock "units" transmit clock 464 is out of synchronization with the source node receive clock. The unit of phase is a single reference clock tick at the SRTS reference clock frequency of 2.43 MHz. The range of phase error 450 is a value within the range of the standard RTS 4 bit length. Successive source and destination RTS samples are compared each time a new destination RTS sample is created.

Clock generation stage 406 generates transmit clock 464 having a nominal frequency at which the source data is transmitted to destination CPE 310. Clock generation stage 406 adjusts the frequency of the transmit clock in accordance with the value of phase error 450. Clock generation stage 406 includes a low pass filter 456 for filtering RTS phase error 450, a numerically controlled oscillator (NCO) 460 for generating transmit clock 464 based upon a control signal 458 generated by low pass filter 456, and a transmitter 466 for transmitting source data 418 at the frequency of the transmit clock generated by the NCO.

In the preferred embodiment of the present invention the low pass filter 456 is a digital low pass filter configured to remove high frequency components from the RTS phase error signal 450. However, as one skilled in the art would find apparent, the low pass filter may be implemented digitally, in analog, or with a combination of digital and analog elements. It should be noted, however, that digitally filtering the phase error enables the present invention to filter a large frequency range of error signal, including low frequency signals not easily addressed by analog filters. The function and operation of low pass filter 456 is considered to be well known to those skilled in the relevant art.

NCO 460 provides an appropriate transmit clock frequency, such as a T1 or E1 frequency, with a small offset proportional to the value of control signal 458. It is considered to be apparent to those skilled in the art that NCO 460 may be any commonly known NCO or other type of variable oscillator now or later developed and that the NCO may be implemented in digital, analog, or a combination of digital and analog elements. For example, a phase lock loop (PLL) may be used in conjunction with additional circuitry. It should be noted however, that the preferred digital implementation is desirable over the analog implementation due to its increased stability with respect to voltage, temperature, and aging of the circuit. Furthermore, in the preferred ASIC implementation of the destination module, an all-digital NCO is considerably less costly and more efficient to manufacture.

As noted, source data 418 previously buffered in data FIFO 420 is retrieved by transmitter 466 for transmission over transmit line 324 to destination CPE 310 at the rate of transmit clock 464.

C. Adaptive Clock Recovery (ACR) Destination Module

Figure 5:
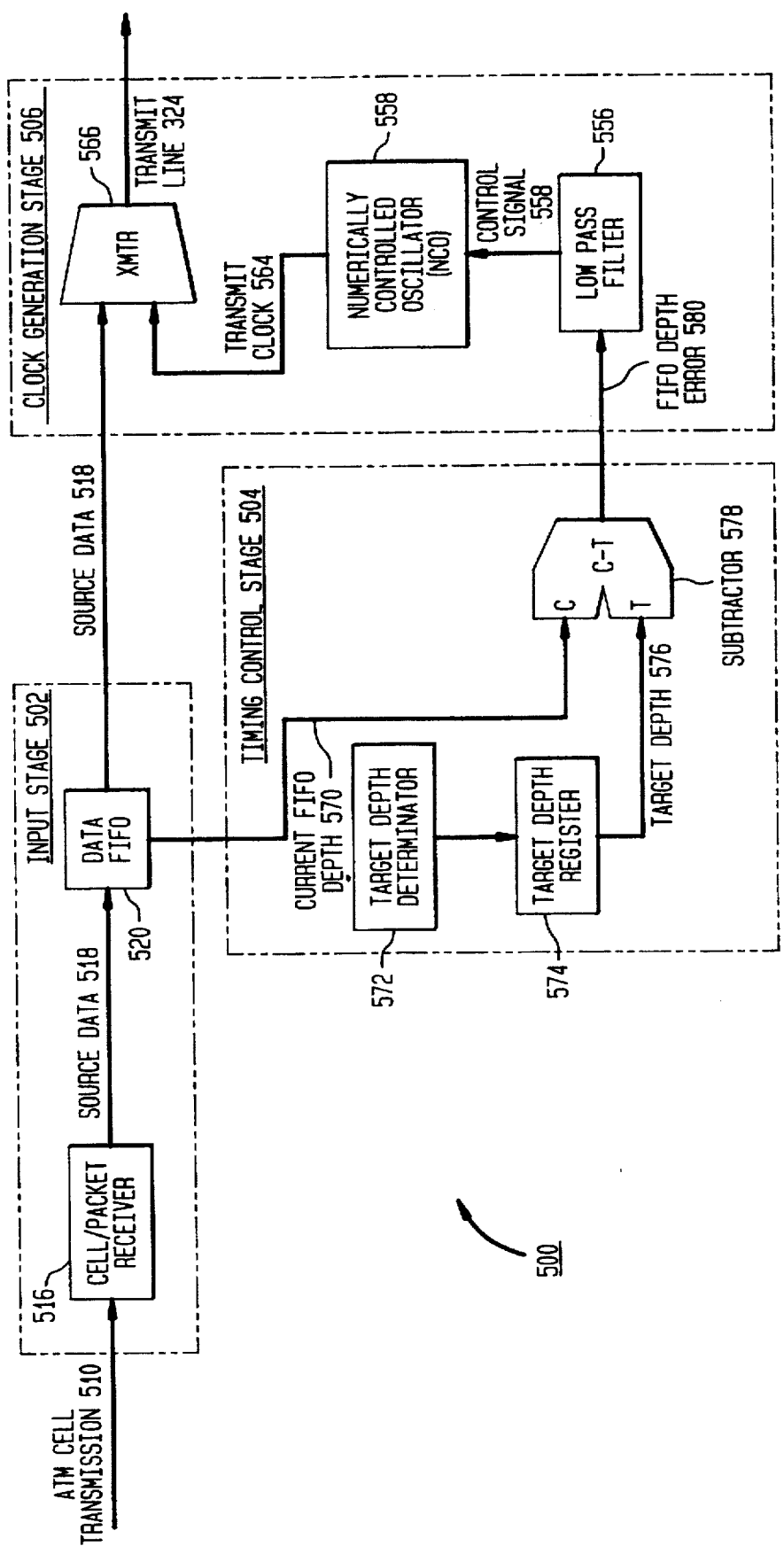
FIG. 5 is a functional block diagram of the destination module of the present invention configured to perform adaptive clock recovery (ACR) processing.

In another preferred embodiment of the present invention, destination module 312 may be configured to perform adaptive clock recovery (ACR) techniques utilizing many of the same functional elements as the SRTS clock recovery method described above. FIG. 5 is a functional schematic block diagram of destination module 312 of the present invention configured to perform adaptive clock recovery, referred to as ACR destination module 500. ACR destination module 500 maintains data buffer 520 near a target depth representing an optimal FIFO depth to ensure proper reception and transmission of source data 518 by varying the transmit clock rate about its nominal value. This achieves constant bit rate service without requiring a network reference clock, enabling the ACR destination module to operate in networks wherein the network reference clock is unavailable. It is also noted that the ACR destination module 500 may communicate with source nodes that do not implement the SRTS clock recovery method.

As in the SRTS destination module 400, ACR destination module 500 includes three stages: an input stage 502, an ACR timing control stage 504, and a clock generation stage 506. Input stage 502 includes a cell/packet receiver 516 coupled to a data FIFO 520 and, in the preferred embodiment, an RTS FIFO not shown. These components operate the same manner as their counterparts in SRTS input stage 402. Thus, as described above with reference to the SRTS input stage 402, cell/packet receiver 516 parses an incoming ATM cell transmission 510 into an RTS portion (if any) and a source data portion 518 and loads them into FIFOs upon receipt. However, as noted, ACR destination module does not utilize an RTS sample in determining the transmit clock frequency. Thus, any RTS samples loaded into the RTS FIFO are not retrieved or considered by the ACR destination module. Thus, in an alternative embodiment, cell/packet receiver 516 may discard the source RTS samples. In either event, the source data located in the data FIFO is thereafter available to clock generation stage 506 for transmission. Particular to ACR destination module 500, data FIFO 520 includes a pointer for generating a current data FIFO depth 570 for ACR timing control stage 504.

ACR timing control stage 504 includes a target depth determinator 572, a target depth register 574, and a subtractor 578. Target depth determinator 572 determines the target depth of data FIFO 520. In the preferred embodiment of the present invention, target depth determinator 572 receives a user-determined target FIFO depth, typically based upon the characteristics of the ATM network. Should the user not provide a desired target depth, target depth determinator 572 provides a default target depth or, alternatively, automatically determine target FIFO depth 576 based upon the amount of cell delay variation (CDV) anticipated for network 300. Once target FIFO depth 576 is determined, target depth determinator 572 loads target FIFO depth 576 into register 574.

Subtractor 578 determines the deviation between the current and target FIFO depth and presents it to clock generation stage 506 as FIFO depth error 580. Current FIFO depth 570 is provided to the current input of subtractor 578 by data FIFO 520 and target FIFO depth 576 is provided to a target input of subtractor 578 by target depth register 574. Subtractor 578 subtracts the target FIFO depth from the current FIFO depth to produce FIFO depth error 580. FIFO depth error samples are generated periodically. In the preferred embodiment, the creation of a new destination RTS sample (which is otherwise ignored) triggers the generation of a new FIFO depth error. Other periodic triggering means could also be employed.

Clock generation stage 506 includes a low pass filter 556, an NCO 558, and a transmitter 566. Clock generation stage 506 operates in a manner similar to the SRTS clock generating stage 406 described above. However, clock generation stage 506 generates transmit clock 564 at a frequency adjusted in accordance with the value of FIFO depth error 580 such that the transmit frequency best matches the rate at which the source data is received, and thus has an average frequency exactly equal to the frequency of the input data of the source node.

D. Synchronous Network Clocking (SNC) Destination Module

Figure 6:
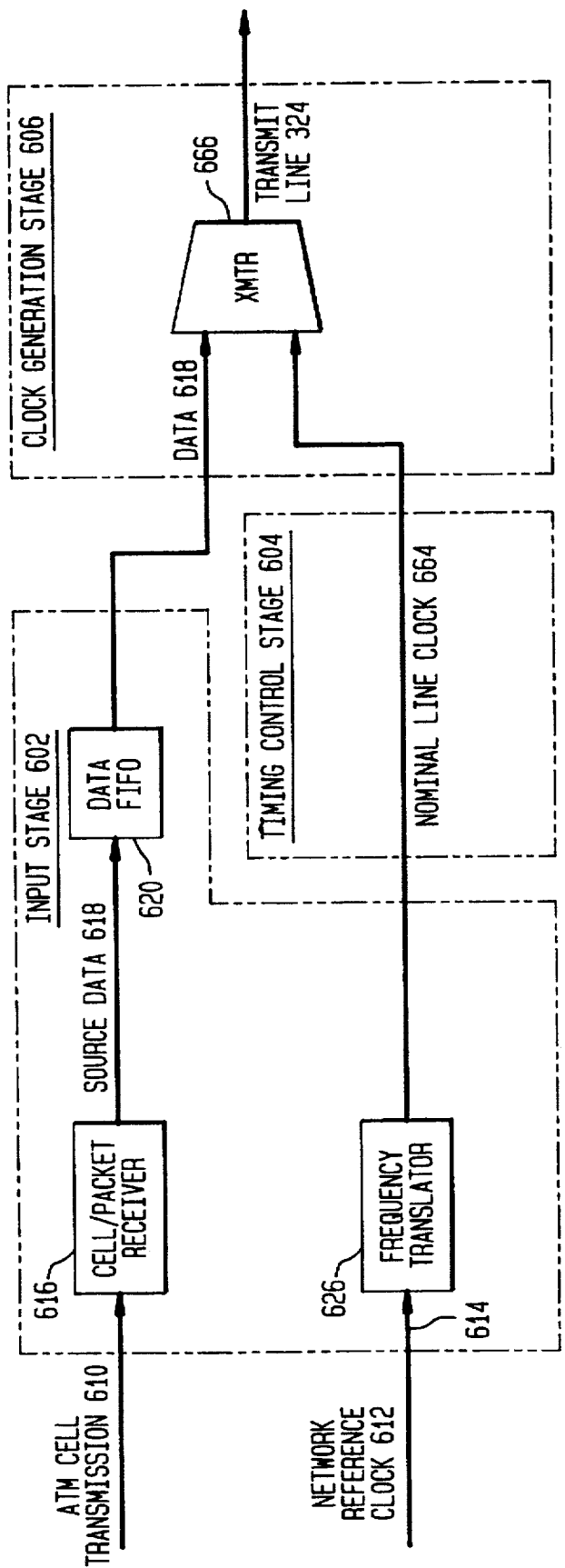
FIG. 6 is a functional block diagram of the destination module of the present invention configured to perform synchronous network clocking (SNC) processing.

In another preferred embodiment of the present invention, destination module 312 may be configured to perform synchronous network clocking, referred to as the synchronous network clocking (SNC) destination module 600. Referring to FIG. 6, SNC destination module 600 maintains a constant frequency relationship between the destination node transmit clock and the system reference clock frequencies to ensure proper reception and transmission of source data 618.

As with the SRTS and ACR destination modules, SNC destination module 600 includes three stages: an input stage 602, a timing control stage 604, and a clock generation stage 606. Input stage 602 includes a cell/packet receiver 616 coupled to a data FIFO 620 and, in the preferred embodiment, an RTS FIFO not shown. These components operate in the same manner as their counterparts in the SRTS and ACR input stages described above. Thus, cell/packet receiver 516 parses an incoming ATM cell transmission 610 into an RTS portion (if any) and a source data portion 618 and loads them into FIFOs upon receipt. However, SNC destination module 600 does not utilize an RTS sample in determining the rate of the transmit clock frequency. Thus, any RTS samples loaded into the RTS FIFO are not retrieved or considered by the SNC destination module. Thus, in an alternative embodiment, cell/packet receiver 616 may discard the source RTS samples.

Input stage 602 also includes a frequency translator 626 for processing network reference clock 612 to generate nominal line clock 664. In the preferred embodiment of the present invention, nominal line clock 664 is created with a PLL which also attenuates any jitter found on the reference clock. It is then passed through SNC timing control stage 604 to clock generation state 606.

Clock generation stage 606 includes only transmitter 666. Clock generation stage 606 retrieves source data 618 from data buffer 620 and transmits the source data over transmit line 324 to destination CPE 310 at the rate of nominal line clock 664.

E. Multi-Stage Multi-Function Destination Module

Figure 7:
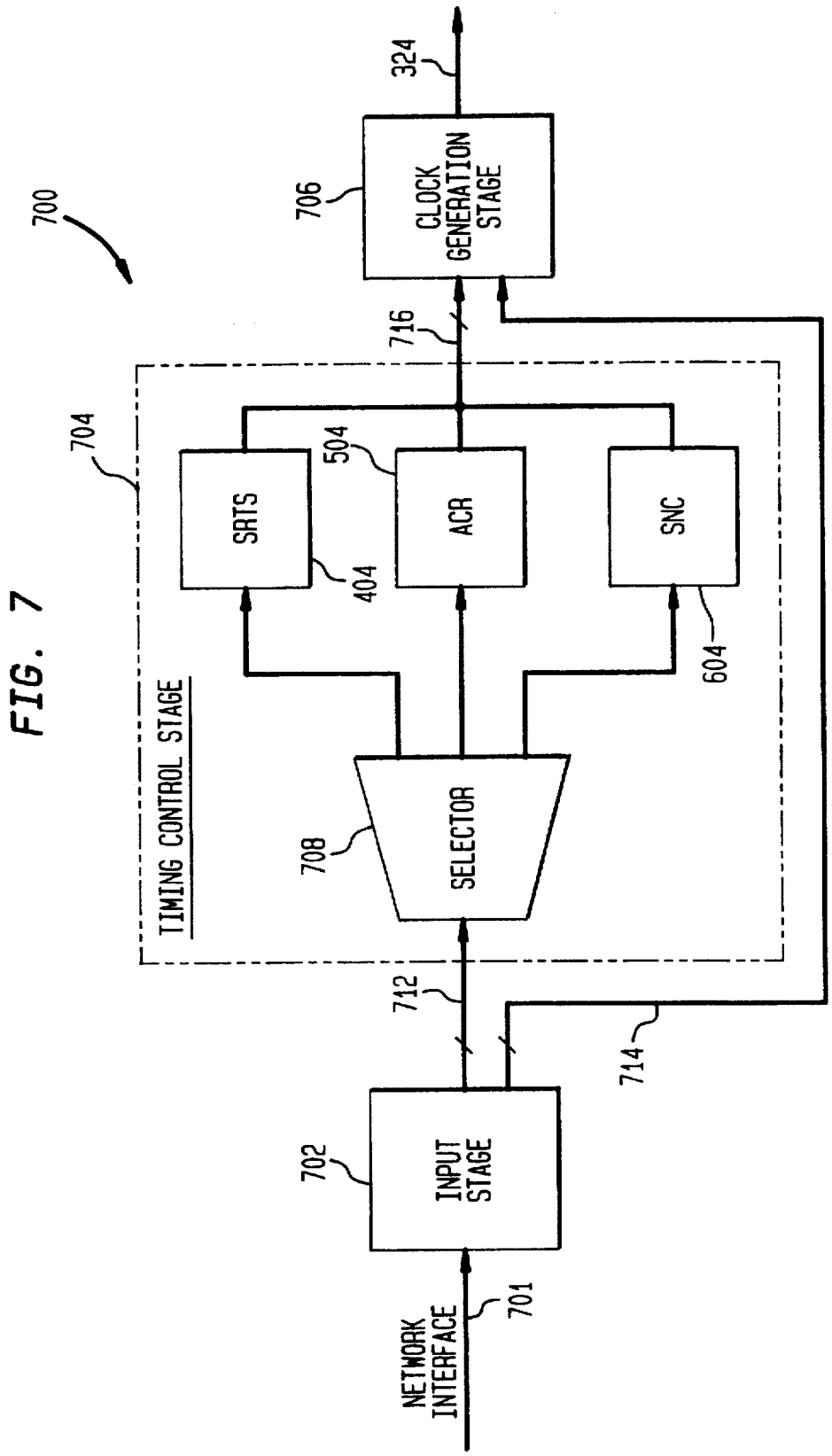
FIG. 7 is a schematic block diagram of a preferred embodiment of the destination module of the present invention configured to perform a selected one of the three above techniques.

In another preferred embodiment of the present invention, the destination module may be configured to perform SRTS clock recovery, ACR, as well as SNC techniques. Referring to FIG. 7, a multi-stage, multi-function destination module 700 ensures proper reception and transmission of information over a network regardless of whether the network has a reference clock and regardless of the clock recovery method employed by the source node.

Destination module 700 includes three stages corresponding to the three stages of each of the above destination module embodiments: an input stage 702, a timing control stage 704, and a clock generation stage 706.

Input stage 702 receives network transmissions including the source data and the network reference clock via network interface 701. Input stage 702 performs various functions to ensure proper reception of the network transmission and provides data and control signals to timing control stage 704 via control/data line(s) 712 and to clock generation stage 706 via control/data line(s) 714. Input stage 702 includes those components illustrated in each of the input stages 402, 502, and 602 above, with only one of each of the common elements provided. For example, a single cell/packet receiver, data FIFO, and RTS FIFO need be provided. Note that frequency translators 626 and 426 perform different functions and thus, in destination modules implementing SRTS and SNC techniques, both frequency translations should be included in input stage 702.

Timing control stage 704 includes a plurality of timing mechanisms that provide controlling information to clock generation stage 706 to ensure proper transmission of the source data to destination CPE 310. In this embodiment of the invention, the timing control stage 704 includes SRTS timing control stage 404, ACR timing control stage 504, and a synchronous network clocking (SNC) timing control stage 604 as timing mechanisms of the larger timing control stage.

In this embodiment of the invention, timing control stage 704 also includes a selector 708 for selecting one of the available timing control mechanisms. Destination module 700 performs clock recovery and network synchronization functions in accordance with the selected timing mechanism to ensure the proper reception and transmission of the data to destination CPE 310. The selection of the desired timing mechanism may be performed at destination node 700 as well as at destination CPE 310. In the latter case, the user-selected timing control mechanism is provided to destination node 306 via a configuration interface, not shown.

Clock generation stage 706 generates the transmit clock at which the source data is transmitted to destination CPE 310. Clock generation stage 706 adjusts the frequency of the transmit clock in response to a control signal generated by the selected timing control mechanism in timing control stage 704. The control signal is provided to clock generation stage 706 via control lines 716. Clock generation stage 706 includes the components described with reference to the three above embodiments: a low pass filter, NCO, and transmitter. In those embodiments implementing synchronous network clocking with SRTS clock recovery and/or ACR, a means for switching between the nominal line clock 664 generated by the SNC input stage and the transmit clock 464/564 generated by the NCO for either or both of the other two methods is provided. For example, a selector having transmit clock 464/564 as one input and the nominal line clock 664 as another input may be used to gate the appropriate signal to the transmitter 466, 566, 666.

Thus, destination module 312 continually adjusts the transmit frequency in accordance with the criteria established by the selected timing control mechanism to ensure proper reception of the network transmission from source ATM switch 304 as well as to ensure that the source data is properly transmitted to destination CPE 310. In this way, from the perspective of the source and destination CPEs, the present invention enables network 300 to provide constant bit rate service, emulating a circuit coupling source CPE 308 and destination CPE 310.

The ability of the destination module to implement multiple timing techniques provides network node 306 with the capability to interface any type of CPE with the network 302 regardless of the timing requirements of the CPE. In addition, the ability to implement more than one timing technique provides network node 306 with the ability to communicate with any type of source node regardless of the clock recovery or network synchronization method employed by that source node, and the ability to work with or without the availability of a system reference clock. Furthermore, selector 708 enables a user to reconfigure the destination node 306 to support different user timing requirements as well as to communicate with different types of nodes.

As described above, the preferred embodiment of the present invention is implemented in a SONET network. However, as one skilled in the relevant art would find apparent, the present invention may be implemented to operate with other carrier technologies. For example, network 302 may be any circuit, cell, or packet based transmission system, such as SDH, DS3, E3, or FDDI.

Furthermore, network 300 may be any type network appropriate for a given application. For example, network 100 may be a large public wide area carrier transport system. Alternatively, network 100 may be a private wide area network (WAN), local area network (LAN), etc.

Commonly-assigned U.S. Patent Application entitled "An Improved SRTS Clock Recovery System For Use in a Highly Stressed Network Environment," Ser. No. 08/573,297, now U.S. Pat. No. 5,742,649, issued Apr. 12, 1998, naming as inventors Gary S. Muntz and Stanley A. Lackey, Jr., is hereby incorporated by reference in its entirety. Likewise, commonly-assigned U.S. Patent Application entitled "An Improved SRTS Clock Recovery System Implementing Adaptive Clock Recovery Techniques," Ser. No. 08/573,302, naming as inventors Gary S. Muntz and Steven E. Jacobs, and filed concurrently with said parent, is hereby incorporated by reference in its entirety.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A destination module for ensuring proper reception and transmission of data received via a network, the data being contained in an information stream transmitted from a source node via the network, the source node having a source clock for generating a source clock signal, said destination module comprising:

an input stage for receiving said information stream, recovering said data and a first synchronous residual time-stamp (SRTS) value from said information stream, and providing said data to a data buffer for storage therein;

a clock generation stage for generating a transmit clock signal at a predetermined frequency, said transmit clock signal being for controlling a rate at which said data is transmitted from said data buffer; and a SRTS timing control stage for generating a control signal for controlling said clock generation stage so as to adjust the predetermined frequency of said transmit clock signal, said control signal being generated solely based upon a residual time-stamp (RTS) clock recovery technique, said control stage utilizing said first SRTS value and a second SRTS value to generate said control signal, said control stage generating said second SRTS value based upon said transmit and network clock signals.

2. A destination module according to claim 1, wherein said timing control stage generates said control signal based, at least in part, upon comparison of said first SRTS value to said second SRTS value.

3. A destination module according to claim 2, wherein said clock generation stage comprises a numerically controlled oscillator for generating said transmit clock signal, and said numerically controlled oscillator is controlled by said control signal.

4. A destination module according to claim 3, wherein said destination module comprises a filter for filtering an error signal to generate said control signal, said error signal being generated based, at least in part, upon said comparison of said first and second SRTS values.

5. A destination module according to claim 2, wherein said control stage comprises a subtractor for subtracting one of said first and second SRTS values from the other of said first and second SRTS values whereby to carry out comparison.

* * * * *